(12) United States Patent
Nakano et al.

(10) Patent No.: US 7,715,171 B2
(45) Date of Patent: May 11, 2010

(54) MULTILAYER CERAMIC CAPACITOR

(75) Inventors: Makito Nakano, Shiga-ken (JP);
Noriyuki Inoue, Shiga-ken (JP);
Kenichi Kawasaki, Fukui-ken (JP)

(73) Assignee: Murata Manufacturing Co., Ltd.,
Kyoto-fu (JP)

( * ) Notice: Subject to any disclaimer, the term of this patent is extended or adjusted under 35 U.S.C. 154(b) by 242 days.

(21) Appl. No.: 12/022,722

(22) Filed: Jan. 30, 2008

(65) Prior Publication Data

US 2008/0130198 A1 Jun. 5, 2008

Related U.S. Application Data

(63) Continuation of application No. PCT/JP2006/313725, filed on Jul. 11, 2006.

(30) Foreign Application Priority Data

Aug. 19, 2005 (JP) .............................. 2005-238618

(51) Int. Cl.
*H01G 4/005* (2006.01)
*H01G 4/06* (2006.01)

(52) U.S. Cl. ....................... 361/303; 361/311
(58) Field of Classification Search ......... 361/303–305, 361/311, 306.1, 306.3, 309
See application file for complete search history.

(56) References Cited

U.S. PATENT DOCUMENTS

| | | | | |
|---|---|---|---|---|
| 6,091,598 | A * | 7/2000 | Kobayashi | 361/303 |
| 6,226,169 | B1 * | 5/2001 | Naito et al. | 361/303 |
| 6,292,350 | B1 * | 9/2001 | Naito et al. | 361/306.3 |
| 6,940,710 | B1 * | 9/2005 | Lee et al. | 361/321.2 |
| 6,965,507 | B2 * | 11/2005 | Togashi et al. | 361/303 |
| 7,019,957 | B2 * | 3/2006 | Togashi et al. | 361/303 |
| 7,019,958 | B2 * | 3/2006 | Togashi et al. | 361/303 |
| 7,046,500 | B2 * | 5/2006 | Lee et al. | 361/303 |
| 7,075,774 | B2 * | 7/2006 | Togashi et al. | 361/306.3 |
| 7,180,723 | B2 * | 2/2007 | Togashi et al. | 361/303 |
| 2001/0055191 | A1 * | 12/2001 | Naito et al. | 361/303 |

FOREIGN PATENT DOCUMENTS

| | | |
|---|---|---|
| JP | 07-032936 | 2/1995 |
| JP | 08-181033 | 7/1996 |
| JP | 09-180958 | 7/1997 |
| JP | 09-190946 | 7/1997 |
| JP | 09-266130 | 10/1997 |
| JP | 10-261544 | 9/1998 |
| JP | 2000-124057 | 4/2000 |
| JP | 2000-281435 | 10/2000 |
| JP | 2004-39937 | 2/2004 |
| JP | 2005-294353 | 10/2005 |

* cited by examiner

*Primary Examiner*—Eric Thomas
(74) *Attorney, Agent, or Firm*—Dickstein Shapiro LLP

(57) ABSTRACT

The "squeal" that occurs when an electric field is applied to a multilayer ceramic capacitor mounted on a substrate is suppressed by providing in an active part contributing to formation of capacitances between internal electrodes facing each other in a capacitor body, low-activity regions positioned near respective end edges of respective external electrodes. A facing area of the internal electrodes in the low-activity regions is less than or equal to one fifth that of the internal electrodes in a normal region having the same volume as that of the low-activity regions. This makes it possible to suppress occurrence of electric-field-induced distortion near the external electrodes bonded to a substrate and reduce the force that causes the substrate to bend.

18 Claims, 10 Drawing Sheets

MULTILAYER CERAMIC CAPACITOR

This is a continuation of application Serial No. PCT/JP2006/313725, filed Jul. 11, 2006.

TECHNICAL FIELD

The present invention relates to a multilayer ceramic capacitor and particularly to improvements for suppressing a "squeal" which occurs when an electric field is applied to a multilayer ceramic capacitor mounted on a substrate.

BACKGROUND ART

FIG. 14 is a cross-sectional view of a mounted multilayer ceramic capacitor 1.

The multilayer ceramic capacitor 1 includes a capacitor body 4 having a multilayer structure including a plurality of dielectric ceramic layers 2 and a plurality of internal electrodes 3a and 3b formed along a plurality of respective interfaces between the dielectric ceramic layers 2. The capacitor body 4 has a rectangular parallelepiped shape defined by first and second main surfaces 5 and 6 extending in a direction in which the dielectric ceramic layers 2 extend, first and second end surfaces 7 and 8 extending in a direction orthogonal to the first and second main surfaces 5 and 6, and first and second side surfaces (parallel to the plane of FIG. 14 but not shown in FIG. 14).

Although edges of a capacitor body are generally chamfered, the illustration of chamfered edges of the capacitor body 4 and those of other capacitor bodies is omitted in FIG. 14 and other drawings.

The multilayer ceramic capacitor 1 further includes first and second external electrodes 11 and 12 connected to the internal electrodes 3a and 3b, respectively, such that capacitances formed between the internal electrodes 3a and 3b facing each other with the dielectric ceramic layers 2 therebetween are extracted. The first and second external electrodes 11 and 12 are formed over the respective first and second end surfaces 7 and 8 of the capacitor body 4, and extend therefrom to respective parts of the main surfaces 5 and 6 and side surfaces adjacent to the end surfaces 7 and 8.

The multilayer ceramic capacitor 1 is mounted on a substrate 13 by bonding the first and second external electrodes 11 and 12 to the substrate 13 with a conductive bonding material 14, such as solder or a conductive adhesive, with the first main surface 5 of the capacitor body 4 facing the substrate 13.

A portion contributing to formation of capacitances between the internal electrodes 3a and 3b in the capacitor body 4 will be referred to hereinafter as the "active part". In FIG. 14 illustrating the multilayer ceramic capacitor 1, an active part 15 is represented by a region surrounded by a dashed line. The active part 15 has a rectangular parallelepiped shape.

FIG. 15 illustrates the multilayer ceramic capacitor 1 in the same position as that in FIG. 14. In FIG. 15, the illustration of the internal electrodes 3a and 3b in the capacitor body 4 is omitted and only the active part 15 is illustrated.

When a voltage is applied across the first and second external electrodes 11 and 12 of the multilayer ceramic capacitor 1, dielectric polarization occurs at positions where adjacent internal electrodes 3a and 3b face each other. This makes it possible to obtain capacitances as described above. However, dielectrics provided by the dielectric ceramic layers 2 and located in the active part 15 cause electric-field-induced distortions depending on the applied voltage, as indicated by arrows 16 of FIG. 15. This causes the multilayer ceramic capacitor 1 to be deformed as indicated by dashed lines in FIG. 15.

When an alternating voltage is applied to the multilayer ceramic capacitor 1, deformation of the multilayer ceramic capacitor 1 resulting from electric-field-induced distortion causes the substrate 13 to vibrate and produces a sound called a "squeal". A force that causes the substrate 13 to vibrate is also applied from parts of the external electrodes 11 and 12 located on the first main surface 5 of the capacitor body 4. When the level of "squeal" increases, a noise problem arises.

To suppress "squeal", Japanese Unexamined Patent Application Publication No. 2000-281435 (Patent Document 1) proposes a technique in which a dielectric composition containing $BaTiO_3$, $SrZrO_3$ and $CaZrO_3$ is used as the material of dielectric ceramic layers. This dielectric composition is highly resistant to reduction when baked and has a high dielectric constant, a low distortion factor, and good capacitance-temperature characteristics.

However, there are problems using the technique in which a distortion is suppressed by an improvement in material composition as described in Patent Document 1, in that it is difficult to achieve both a high dielectric constant and the like, and suppression of a distortion, and that the degree of design freedom is limited.

On the other hand, Japanese Unexamined Patent Application Publication No. 2004-39937 (Patent Document 2) proposes a configuration in which a ceramic base in a multilayer ceramic capacitor containing barium titanate as a dielectric material, except where there is an insulating gap, is covered with a metal film, include the terminal electrodes at both ends. The ceramic base is covered with the metal film such that the ratio of the surface area of a portion covered with the metal film to the entire surface area of the ceramic base is greater than or equal to 0.8. Since the surface of the ceramic base is mostly covered with the metal film, the ceramic base has a high stiffness, which makes it possible to suppress mechanical vibrations caused by electrostriction (electric-field-induced distortion).

However, the method of suppressing "squeal" described in Patent Document 2 has a problem in that the process of forming a metal film while maintaining a proper insulating gap is complicated.

Patent Document 1: Japanese Unexamined Patent Application Publication No. 2000-281435

Patent Document 2: Japanese Unexamined Patent Application Publication No. 2004-39937

DISCLOSURE OF INVENTION

Problems to be Solved by the Invention

Accordingly, an object of the present invention is to provide a configuration of a multilayer ceramic capacitor capable of suppressing a "squeal" caused by electric-field-induced distortion, without affecting the material composition of a dielectric composition and without using an additional component.

Means for Solving the Problems

In summary, the present invention is directed to solving the technical problems described above by modifying the configuration of internal electrodes.

A multilayer ceramic capacitor according to the present invention includes a capacitor body and first and second external electrodes.

The capacitor body has a multilayer structure including a plurality of dielectric ceramic layers and a plurality of internal electrodes formed along a plurality of respective interfaces between the dielectric ceramic layers, and has a substantially rectangular parallelepiped shape defined by first and second main surfaces extending in a direction in which the dielectric ceramic layers extend, first and second end surfaces extending in a direction orthogonal to the main surfaces, and first and second side surfaces.

The first and second external electrodes are formed over the respective first and second end surfaces, extend therefrom to respective parts of the main surfaces and side surfaces adjacent to the end surfaces, and are connected to specific ones of the internal electrodes such that capacitances formed between the internal electrodes facing each other with the dielectric ceramic layers therebetween are extracted.

In the capacitor body, the active part contributing to formation of capacitances between the internal electrodes facing each other has a substantially rectangular parallelepiped shape.

The multilayer ceramic capacitor is mounted on a substrate by bonding the external electrodes thereto with a conductive bonding material, with the first main surface of the capacitor body facing the substrate.

The multilayer ceramic capacitor with this configuration is characterized in that it has a configuration to solve the technical problems described above.

That is, the multilayer ceramic capacitor is characterized in that where L is a distance between the first and second end surfaces in the longitudinal direction of the capacitor body, low-activity regions are positioned in respective cylindrical regions in the active part, each cylindrical region having a radius of 0.025 L about a line in which a plane parallel to the end surfaces and passing through a position of an end edge of one of the first and second external electrodes on the first main surface of the capacitor body intersects a surface of the active part adjacent to the first main surface, and a facing area of the internal electrodes for forming capacitances in the low-activity regions is less than or equal to one fifth that of the internal electrodes in a normal region having the same volume as that of the low-activity regions.

In the present invention, it is preferable that the active part be symmetric with respect to a plane parallel to the first and second main surfaces and passing through a center between the first and second main surfaces.

It is to be noted that the scope of the present invention also covers a multilayer ceramic capacitor which is not limited by a mounting condition, such as that described above, in which the multilayer ceramic capacitor is mounted on a substrate by bonding the external electrodes thereto with a conductive bonding material, with the first main surface of the capacitor body facing the substrate.

Advantages

According to the present invention, the low-activity regions are positioned in the respective cylindrical regions in the active part, each cylindrical region having a radius of 0.025 L about a line in which a plane parallel to the end surfaces and passing through a position of an end edge of one of the external electrodes on the first main surface of the capacitor body intersects the surface of the active part adjacent to the first main surface. To put it briefly, in the active part, the low-activity regions are positioned near the respective end edges of the respective external electrodes. Additionally, the facing area of the internal electrodes in the low-activity regions is less than or equal to one fifth that of the internal electrodes in a normal region having the same volume as that of the low-activity regions. Therefore, distortion in the low-activity regions that occurs when an electric field is applied to the multilayer ceramic capacitor can be made small. This makes it possible to suppress force that causes the substrate on which the multilayer ceramic capacitor is mounted to bend and thereby to suppress "squeal".

Also, since the low-activity regions where the facing area of the internal electrodes is made relatively small for suppressing "squeal" according to the present invention are limited regions in the active part, such as regions near the end edges of the external electrodes, it is possible to suppress the "squeal" without significantly sacrificing the capacitances that can be obtained.

Additionally, when the active part according to the present invention is symmetric with respect to a plane parallel to the first and second main surfaces and passing through a center between the first and second main surfaces, there is no need to make a distinction between the first and second main surfaces when the multilayer ceramic capacitor is to be mounted. This makes it possible to achieve an efficient mounting process and reduce mistakes in mounting.

BRIEF DESCRIPTION OF DRAWINGS

FIG. 1A is an overall view of a multilayer ceramic capacitor 1a. FIG. 1B is an enlarged view of part of the multilayer ceramic capacitor 1a.

FIG. 12 illustrates a sample prepared in an exemplary experiment performed according to the present invention and corresponds to FIG. 1A illustrating the multilayer ceramic capacitor 1a.

REFERENCE NUMERALS 1, 1a to 1i multilayer ceramic capacitor
2 dielectric ceramic layer
3a to 3e internal electrode
4 capacitor body
5 first main surface
6 second main surface
7 first end surface
8 second end surface
9 first side surface
10 second side surface
11 first external electrode
12 second external electrode
13 substrate
14 conductive bonding material
15 active part
19, 20 end edge of external electrode
21, 22 plane parallel to end surfaces
23 surface of active part adjacent to first main
24, 25 line serving as central axis
26, 27 radius
28, 29 cylindrical region
30, 31 low-activity region
32 to 37, 39, 40, 42 to 45 notch Best Modes For Carrying Out the Invention FIGS. 1A, 1B, 2A and 2B illustrate a first embodiment of the present invention. As in the case of FIG. 15, FIG. 1A shows the active part 15 instead of internal electrodes. A multilayer ceramic capacitor 1a illustrated in FIG. 1A is to be mounted on a substrate with its lower side being adjacent to the substrate. FIG. 1B is an enlarged view of part of FIG. 1A. FIG. 2A and FIG. 2B are plan views illustrating an internal electrode pattern in the multilayer ceramic capacitor 1a of FIG. 1A. In FIGS. 1A and 1B and FIGS. 2A and 2B, elements equivalent to those illustrated in FIG. 14 and FIG. 15 are given the same reference numerals and redundant description is omitted. Although not illustrated in FIG. 14, first and second side surfaces 9 and 10 are illustrated in FIG. 2.

Figure 1A:
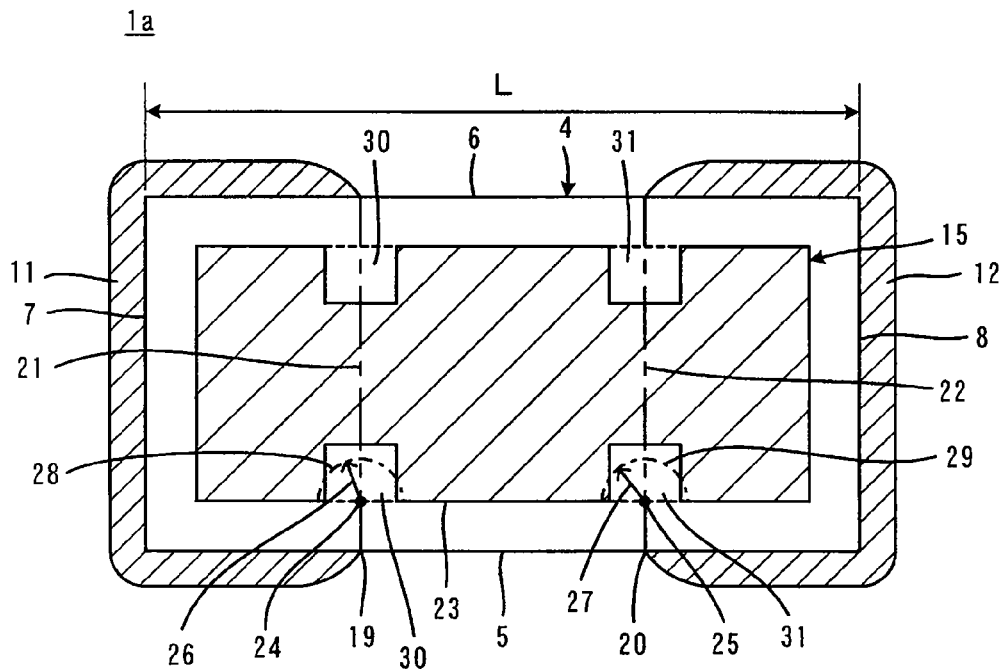
FIGS. 1A and 1B illustrate a first embodiment of the present invention and shows an active part 15 instead of internal electrodes.

A characteristic configuration of the multilayer ceramic capacitor 1a according to the first embodiment will now be described.

Reference character L denotes the distance between the first and second end surfaces 7 and 8 in the longitudinal direction of the capacitor body 4. In the active part 15, a low-activity region 30 is positioned in a cylindrical region 28 having a radius 26 of 0.025 L about a line 24 in which a plane 21 parallel to the end surfaces 7 and 8 and passing through the position of an end edge 19 of the first external electrode 11 on the first main surface 5 of the capacitor body 4 intersects a surface 23 of the active part 15 adjacent to the first main surface 5. Likewise, a low-activity region 31 is positioned in the active part 15 at a cylindrical region 29 having a radius 27 of 0.025 L about a line 25 in which a plane 22 parallel to the end surfaces 7 and 8 and passing the position of an end edge 20 of the second external electrode 12 on the first main surface 5 of the capacitor body 4 intersects the surface 23 of the active part 15 adjacent to the first main surface 5. In the low-activity regions 30 and 31, the area of the adjacent internal electrodes facing one another for forming capacitances is less than or equal to one fifth the facing area of the internal electrodes in a normal region having the same volume as that of the low-activity regions 30 and 31.

Figure 2A:
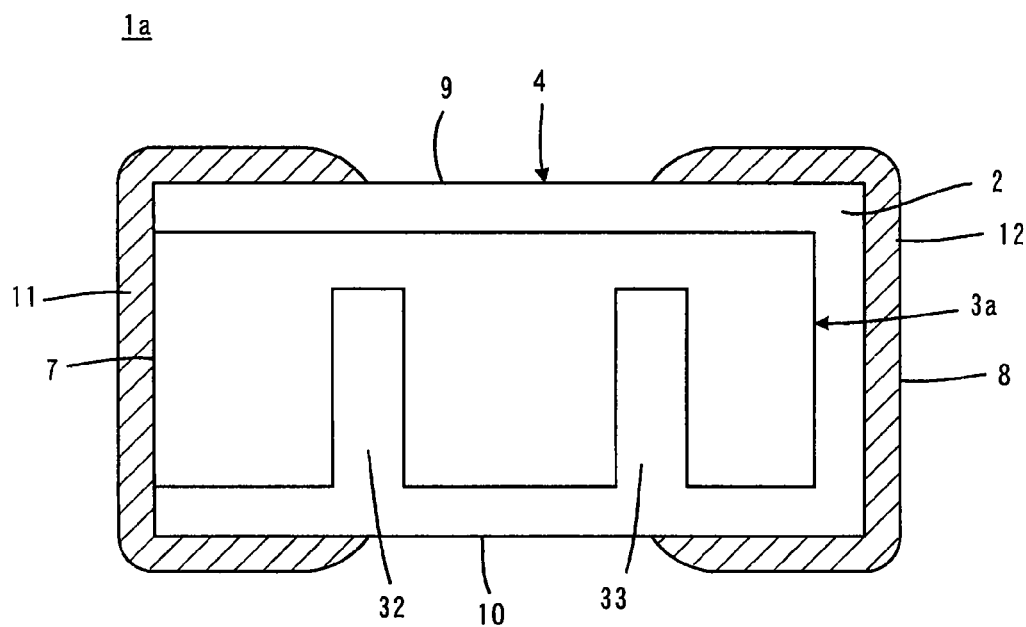
FIG. 2A and FIG. 2B are plan views illustrating an internal electrode pattern in the multilayer ceramic capacitor 1a of FIG. 1.
Figure 2B:
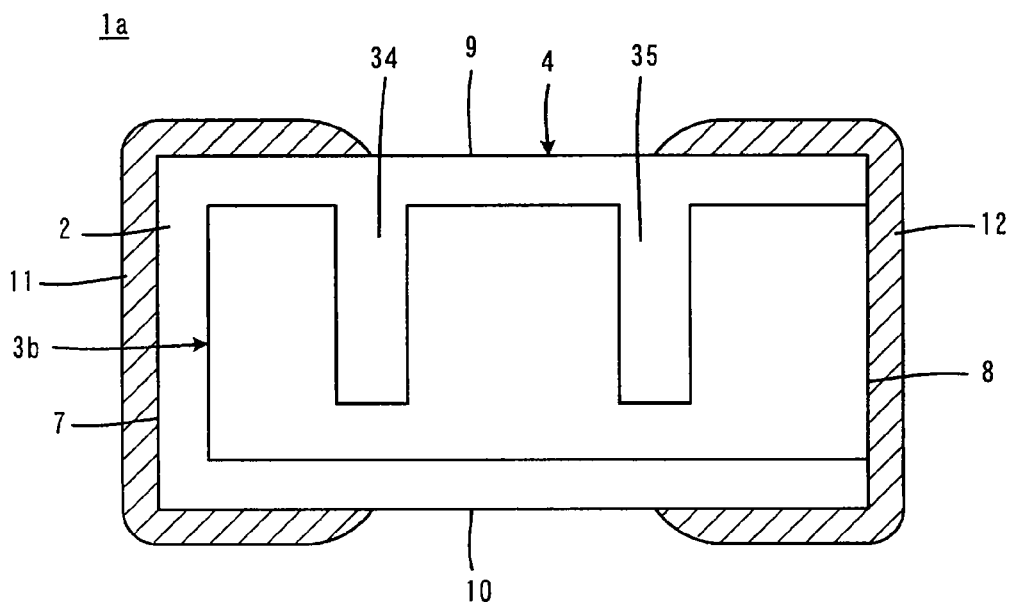

To form the low-activity regions 30 and 31 described above, this embodiment adopts the internal electrode pattern illustrated in FIGS. 2A and 2B. The internal electrodes 3a and 3b facing each other for forming capacitances are illustrated in FIG. 2A and FIG. 2B, respectively.

The internal electrode 3a has a notch 32 and a notch 33 for providing the low-activity region 30 and the low-activity region 31, respectively. Likewise, the internal electrode 3b has a notch 34 and a notch 35 for providing the low-activity region 30 and the low-activity region 31, respectively.

The notches 32 to 35 function such that the area of the facing internal electrodes 3a and 3b in the low-activity regions 30 and 31 is less than or equal to one fifth that in a normal region. Thus, electric-field-induced distortion in the low-activity regions 30 and 31 can be made small. Therefore, when the multilayer ceramic capacitor 1 is mounted on a substrate by bonding the first and second external electrodes 11 and 12 thereto with a conductive bonding material, the force that would cause the substrate to bend and vibrate can be reduced, which makes it possible to suppress "squeal".

Referring back to FIG. 15, the deformation that occurs when a voltage is applied to the multilayer ceramic capacitor 1 of conventional typical type is expressed as $(x1-x2)/x3>0.65$, where x1 is the amount of displacement in a lamination direction at end edges of the first and second external electrodes 11 and 12, x2 is the amount of displacement in the lamination direction at corners at which the first and second end surfaces 7 and 8 of the capacitor body 4 intersect the first main surface 5, and x3 is the amount of displacement in the lamination direction at the center between the first and second end surfaces 7 and 8 of the capacitor body 4.

Since the multilayer ceramic capacitor 1a of the present embodiment has the low-activity regions 30 and 31 in the active part 15, the inclination $(x1-x2)$ that occurs in the first and second external electrodes 11 and 12 when a voltage is applied to the multilayer ceramic capacitor 1a can be made small and thus, $(x1-x2)/x3 \leqq 0.6$ can be satisfied. Therefore, as described above, the force that would cause the substrate to bend and vibrate can be reduced, which makes it possible to suppress "squeal".

In the first embodiment, as illustrated in FIG. 1A, the low-activity regions 30 and 31 are also formed on another side of the active part 15 adjacent to the second main surface 6. This means that the active part 15 is symmetric with respect to a plane parallel to the first and second main surfaces 5 and 6 and passing through a center between the first and second main surfaces 5 and 6. Therefore, when the multilayer ceramic capacitor 1a is to be mounted, there is no need to make a distinction between the first and second main surfaces 5 and 6. This makes it possible to achieve an efficient mounting process and reduce mistakes in mounting.

Figure 3A:
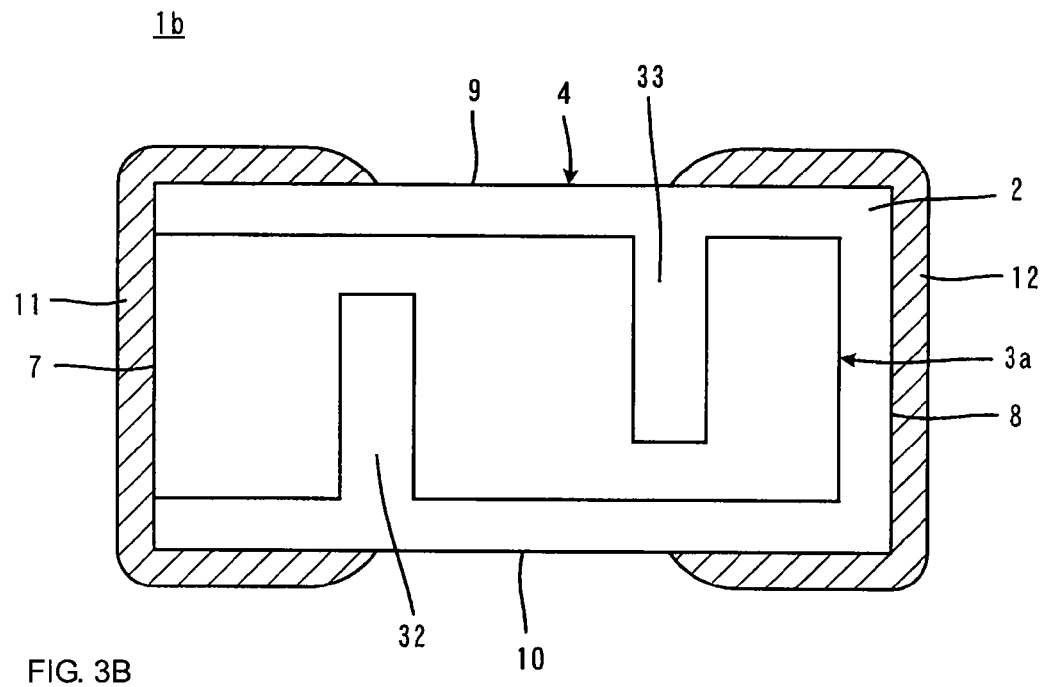
FIGS. 3A and 3B illustrate a second embodiment of the present invention, corresponding to FIG. 2, and shows an exemplary modification of the internal electrode pattern.
Figure 3B:
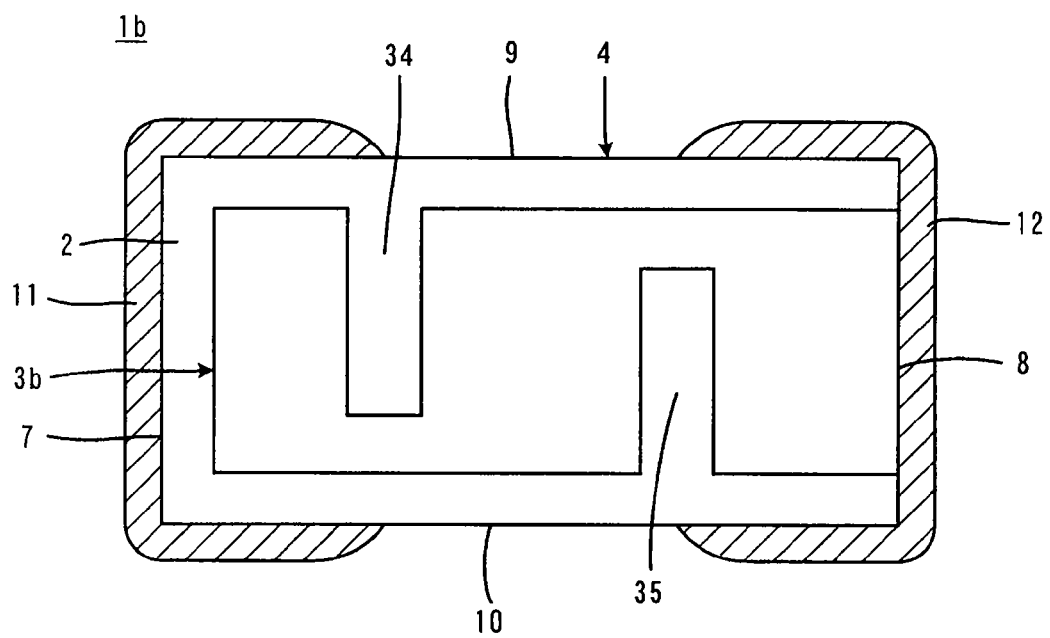

FIGS. 3A and 3B illustrate a multilayer ceramic capacitor 1b according to a second embodiment of the present invention. FIG. 3 corresponds to FIG. 2 and shows an exemplary modification of the internal electrode pattern. In FIG. 3, elements equivalent to those illustrated in FIG. 2 are given the same reference numerals and redundant description is omitted.

As illustrated in FIG. 3A, the notches 32 and 33 formed in the internal electrode 3a have openings on different sides of the internal electrode 3a. Likewise, as illustrated in FIG. 3B, the notches 34 and 35 formed in the internal electrode 3b have openings on different sides of the internal electrode 3b.

The internal electrode patterns illustrated in both FIG. 2 and FIG. 3 are formed such that the internal electrodes 3a and 3b do not face each other in the low-activity regions 30 and 31, that is, such that the facing area of the internal electrodes 3a and 3b in the low-activity regions 30 and 31 is zero. However, this facing area does not necessarily have to be zero, and has only to be less than or equal to one fifth that in a normal region. This is because if the facing area is less than or equal to one fifth that in a normal region, the electric-field-induced distortion in the low-activity regions 30 and 31 can be regarded as substantially zero.

For the internal electrode pattern illustrated in FIG. 2, although the notches 32 and 33 are formed in the internal electrode 3a, there is no need to form any notches in the internal electrode 3b if the width of a narrow portion that remains after formation of the notches 32 and 33 is less than or equal to one fifth the width of the other portion of the internal electrode 3a. Likewise, for the internal electrode pattern illustrated in FIG. 3, although the notches 32 and 33 are formed in the internal electrode 3a, there is no need to form any notches in the internal electrode 3b if the width of a narrow portion that remains after formation of the notches 32 and 33 is less than or equal to one fifth the width of the other portion of the internal electrode 3a.

FIG. 4 illustrate a multilayer ceramic capacitor 1c according to a third embodiment of the present invention. FIG. 4 corresponds to FIG. 2 and shows another exemplary modification of the internal electrode pattern. In FIG. 4, elements equivalent to those illustrated in FIG. 2 are given the same reference numerals and redundant description is omitted.

Figure 4A:
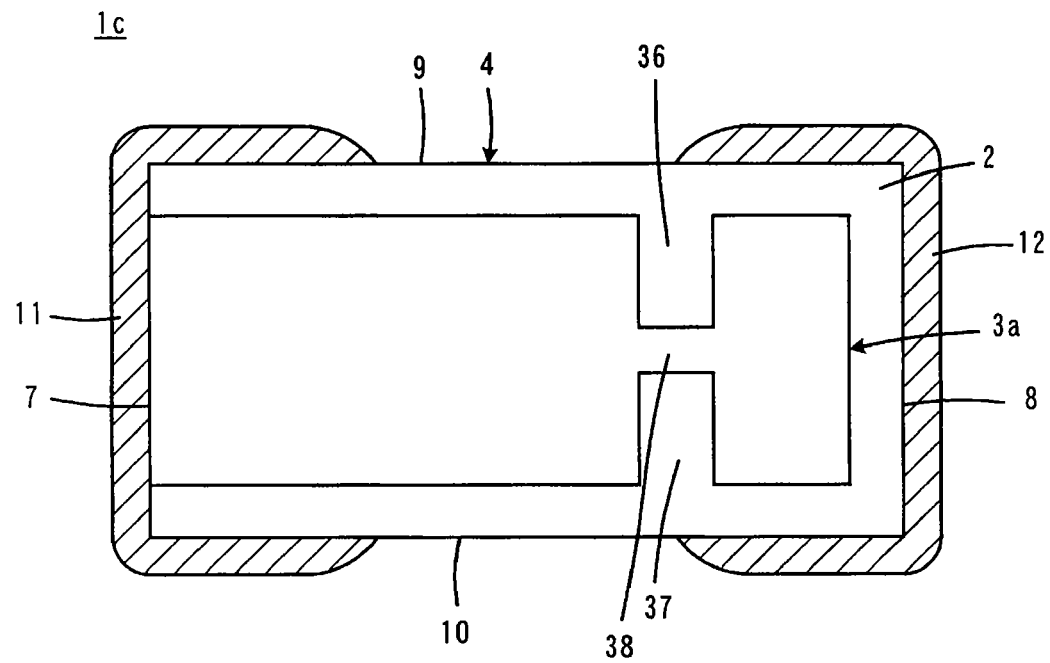
FIGS. 4A and 4B illustrate a third embodiment of the present invention, corresponding to FIG. 2, and shows another exemplary modification of the internal electrode pattern.
Figure 4B:
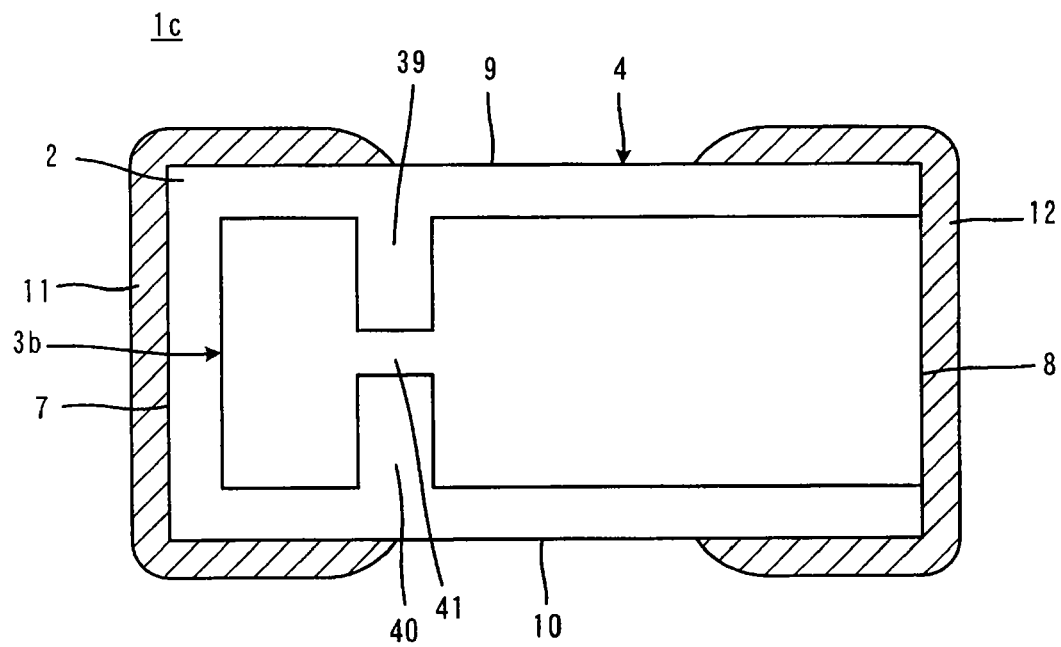

As illustrated in FIG. 4A, notches 36 and 37 for providing the low-activity region 31 are formed in the internal electrode 3a with their openings oriented in directions opposite each other. A narrow portion 38 is left between the notches 36 and 37. Likewise, as illustrated in FIG. 4B, notches 39 and 40 for providing the low-activity region 30 are formed in the internal electrode 3b with their openings oriented in directions opposite each other. A narrow portion 41 is left between the notches 39 and 40. The width of both the narrow portions 41 and 38 is less than or equal to one fifth that of the other portions of the internal electrodes 3a and 3b.

According to the third embodiment illustrated in FIG. 4, in the internal electrodes 3a and 3b face each other at the narrow portions 38 and 41 the low-activity regions 30 and 31. However, since the width of the narrow portions 41 and 38 is less than or equal to one fifth that of the other portions, as described above, the facing area of the internal electrodes 3a and 3b in the low-activity regions 30 and 31 is also less than or equal to one fifth that in a normal region.

FIG. 5 to FIG. 9 illustrate respective fourth to eighth embodiments of the present invention, corresponding to FIG. 1A, and show an exemplary modification of the active part 15. In FIG. 5 to FIG. 9, elements equivalent to those illustrated in FIG. 1A are given the same reference numerals and redundant description is omitted.

Figure 5:
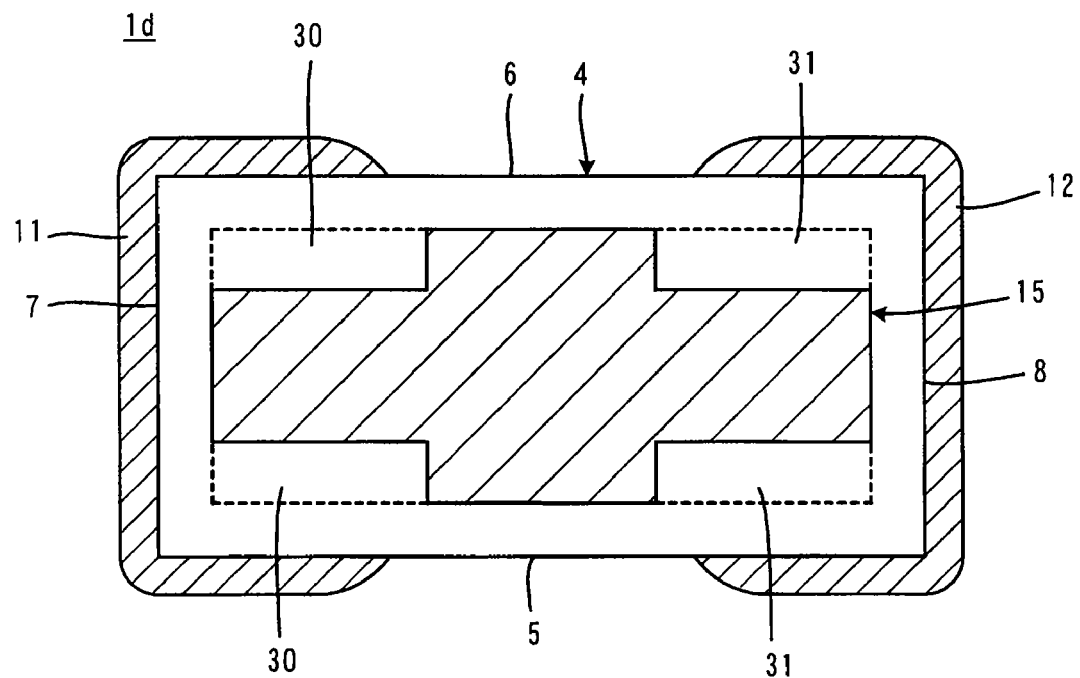
FIG. 5 illustrates a fourth embodiment of the present invention, corresponding to FIG. 1A, and shows an exemplary modification of the active part 15.
Figure 15:
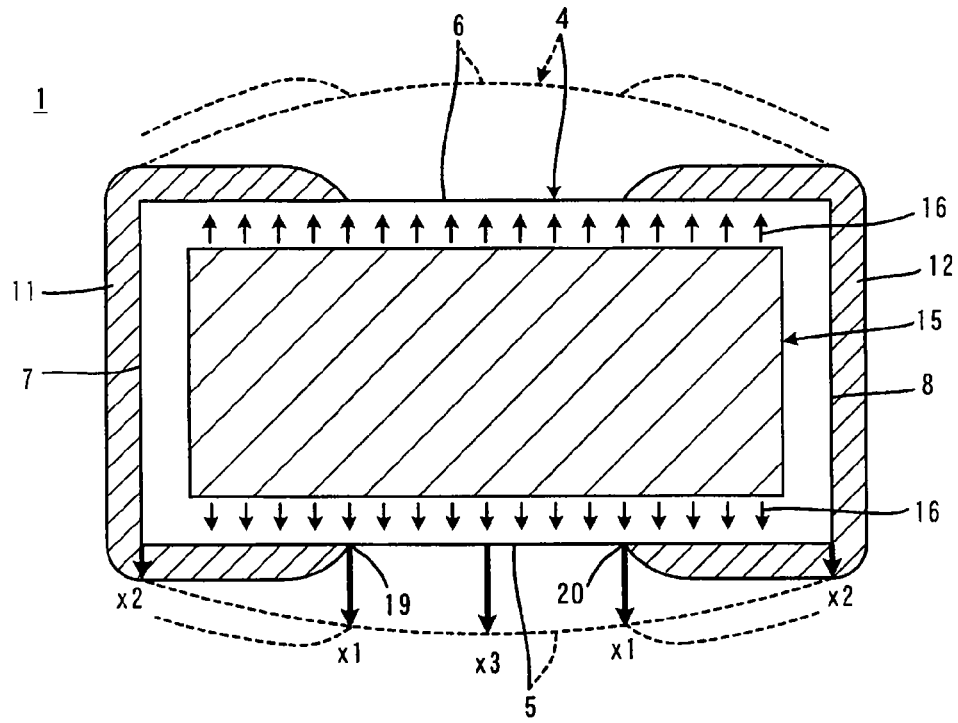
FIG. 15 is a cross-sectional view illustrating electric-field-induced distortion that occurs in the multilayer ceramic capacitor 1 illustrated in FIG. 14.

In a multilayer ceramic capacitor 1d illustrated in FIG. 5, the low-activity regions 30 and 31 reach end portions of the active part 15. With this configuration, since the amount of displacement x2 shown in FIG. 15 is made small, it is difficult to sufficiently reduce the value of (x1−x2)/x3. As a result, it may not be possible to sufficiently suppress deformation of a substrate on which the multilayer ceramic capacitor 1d is mounted.

Figure 6:
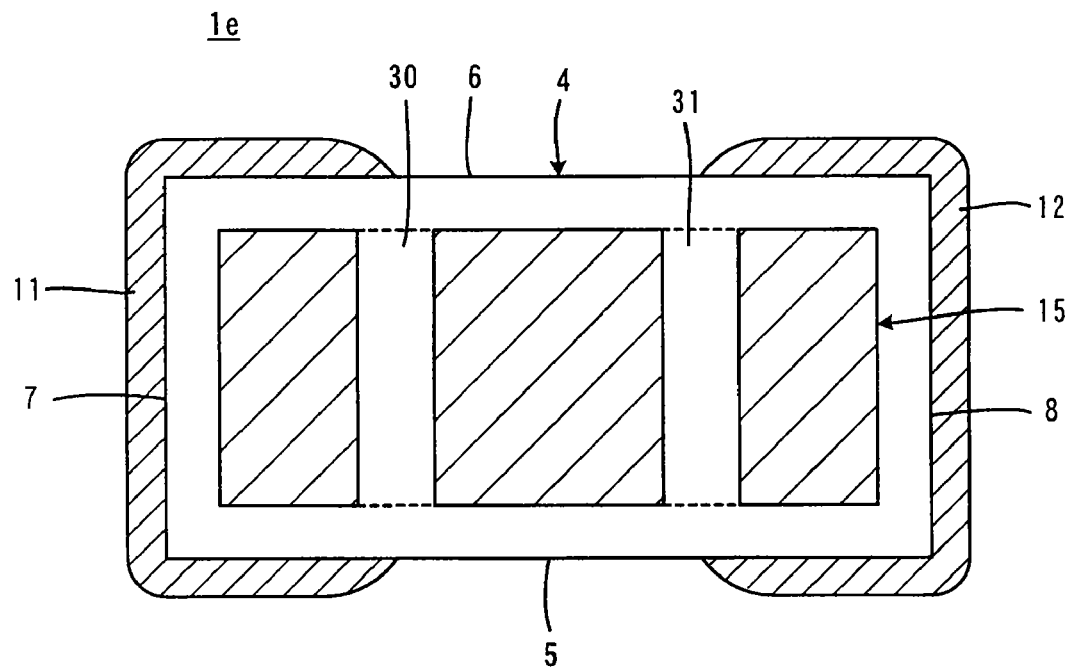
FIG. 6 illustrates a fifth embodiment of the present invention, corresponding to FIG. 1A, and shows another exemplary modification of the active part 15.

In a multilayer ceramic capacitor 1e illustrated in FIG. 6, the low-activity regions 30 and 31 pass through the active part 15 in the thickness direction.

Figure 7:
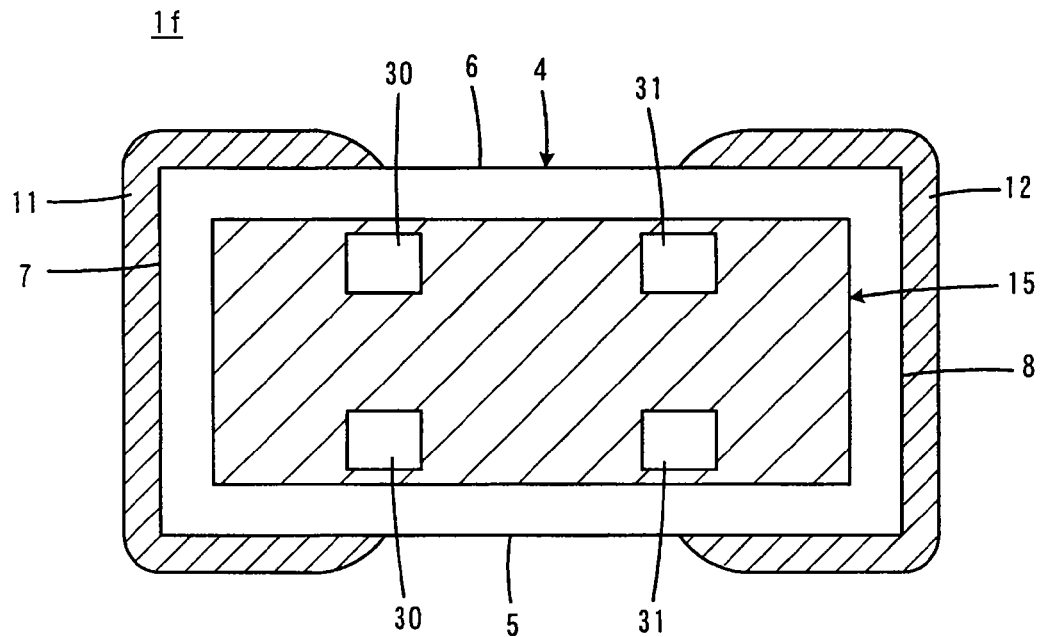
FIG. 7 illustrates a sixth embodiment of the present invention, corresponding to FIG. 1A, and shows still another exemplary modification of the active part 15.

In a multilayer ceramic capacitor 1f illustrated in FIG. 7, the low-activity regions 30 and 31 are formed slightly inside the surface of the active part 15.

Figure 8:
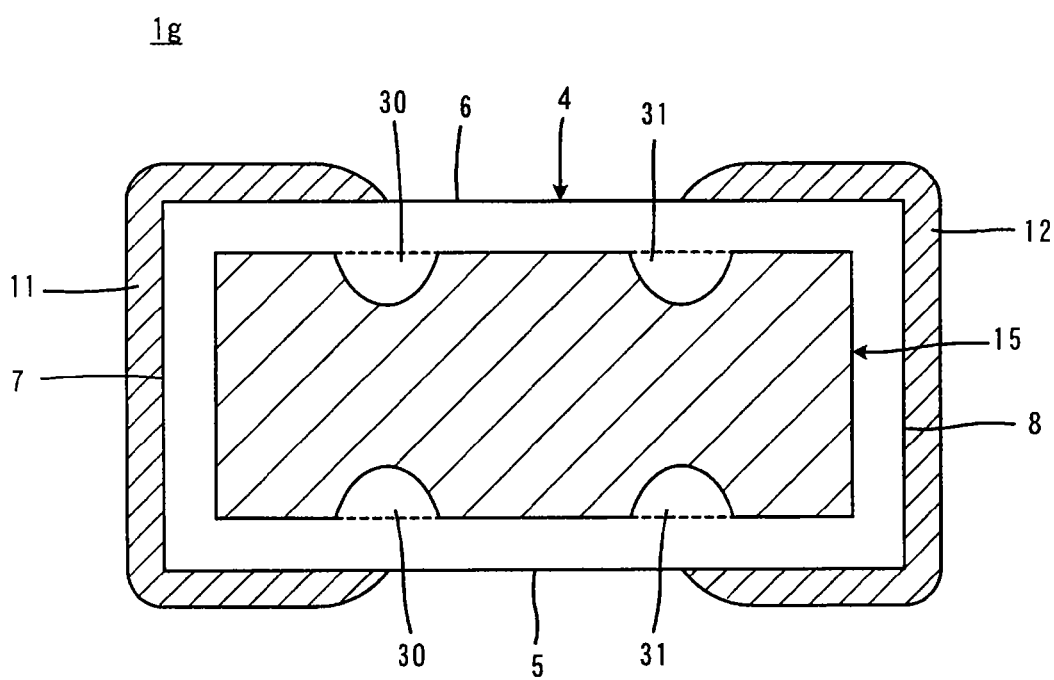
FIG. 8 illustrates a seventh embodiment of the present invention, corresponding to FIG. 1A, and shows still another exemplary modification of the active part 15.

In a multilayer ceramic capacitor 1g illustrated in FIG. 8, there is provided the low-activity region 30 having a semicircular or substantially semicircular cross section, rather than a rectangular cross section. This can be realized, for example, by gradually varying the width of each of the notches 32 to 35 in the internal electrode pattern described with reference to FIG. 2.

Figure 9:
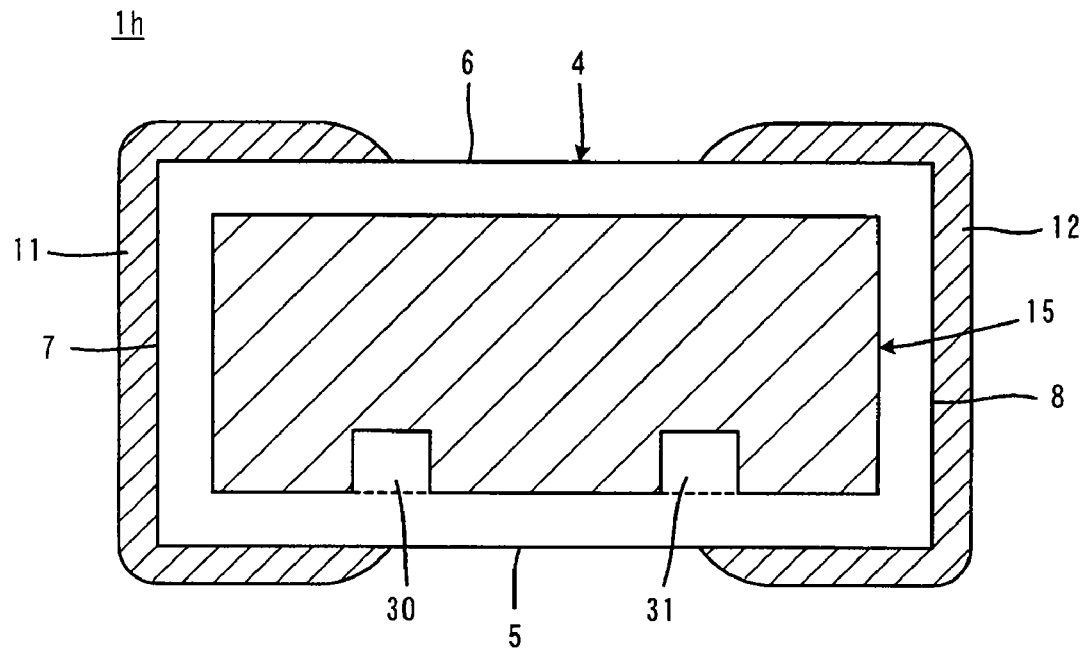
FIG. 9 illustrates an eighth embodiment of the present invention, corresponding to FIG. 1A, and shows still another exemplary modification of the active part 15.

In a multilayer ceramic capacitor 1h illustrated in FIG. 9, the low-activity regions 30 and 31 are formed on only one side of the active part 15. In this embodiment, when the multilayer ceramic capacitor 1h is to be mounted on a substrate, it is necessary to direct the first main surface 5 of the capacitor body 4 adjacent to the low-activity regions 30 and 31 toward the substrate.

The configuration illustrated in FIG. 9, in which the low-activity regions 30 and 31 are formed on only one side of the active part 15, is also applicable to the embodiments described with reference to FIG. 5, FIG. 7, and FIG. 8.

Figure 1B:
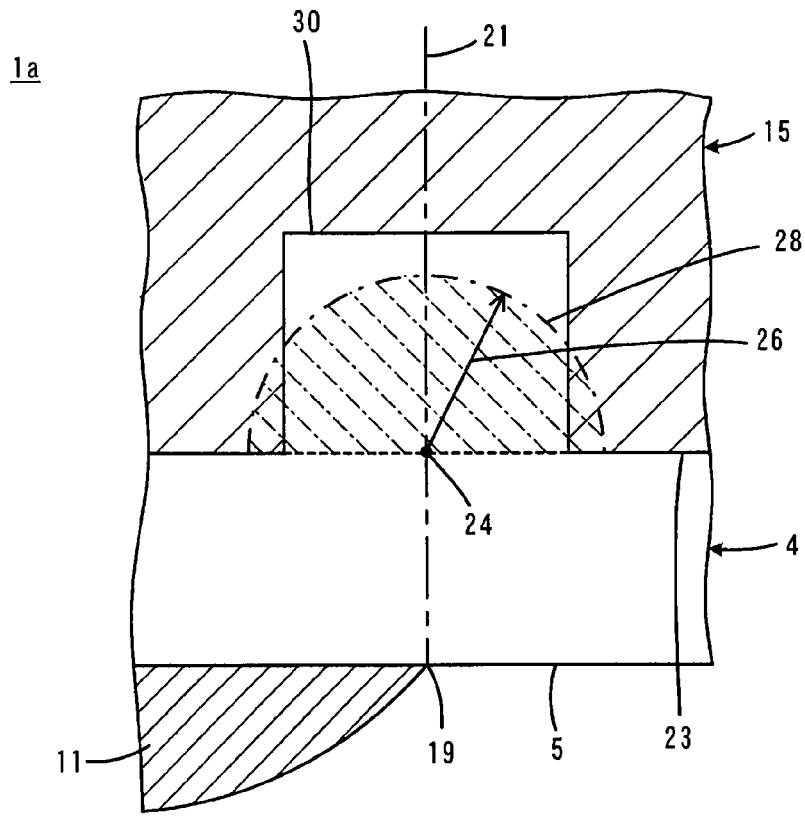
Figure 10:
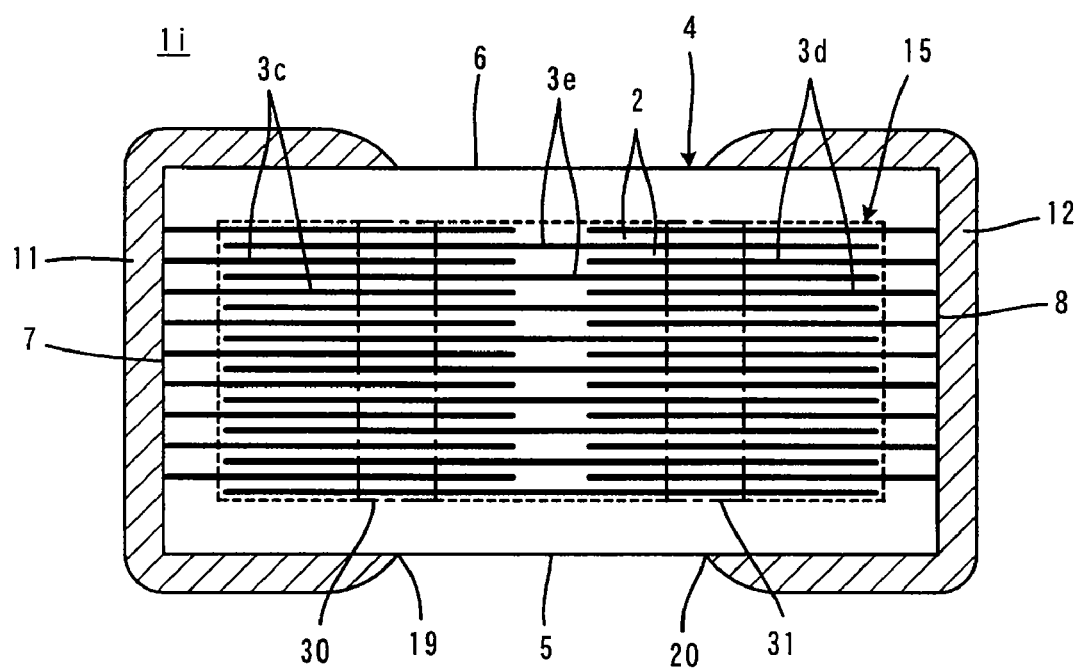
FIG. 10 illustrates a ninth embodiment of the present invention and is a cross-sectional view of a multilayer ceramic capacitor 1i.
Figure 14:
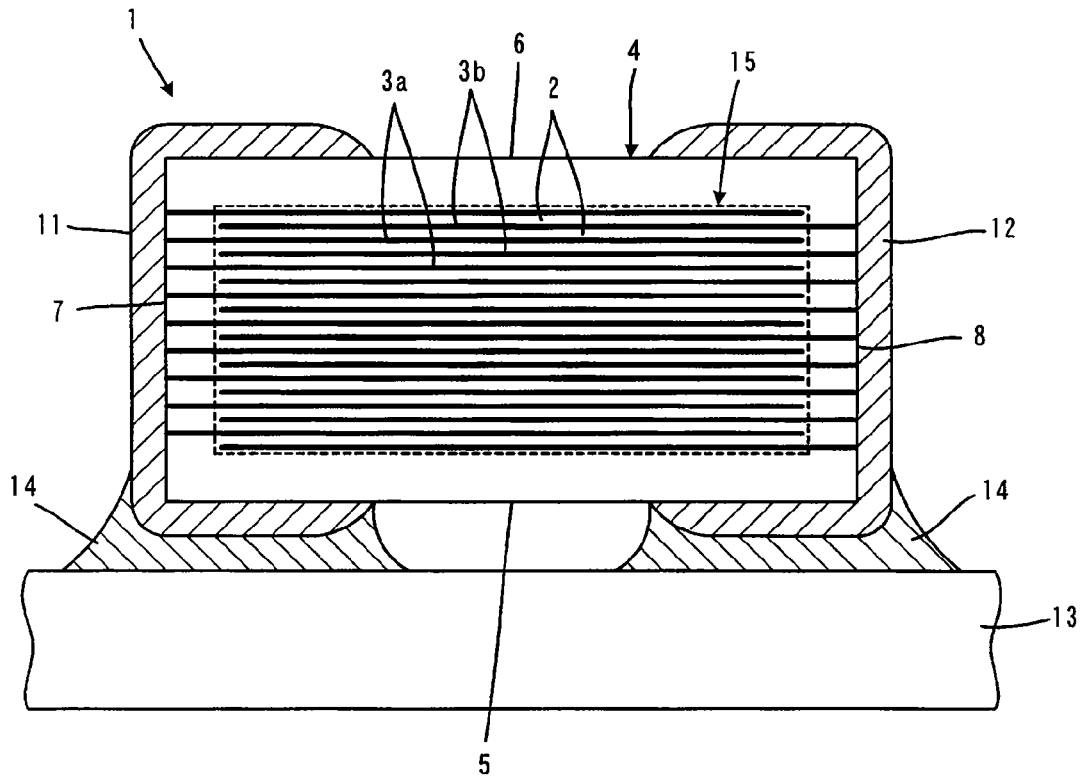
FIG. 14 is a cross-sectional view illustrating a state in which the conventional multilayer ceramic capacitor 1 related to the present invention is mounted on the substrate 13.

FIG. 10 and FIG. 11 illustrate a ninth embodiment of the present invention. FIG. 10 is a cross-sectional view of a multilayer ceramic capacitor 1i. FIG. 11 illustrates an internal electrode pattern in the multilayer ceramic capacitor 1i. In FIG. 10 and FIG. 11, elements equivalent to those illustrated in FIG. 1, FIG. 2, or FIG. 14 are given the same reference numerals and redundant description is omitted.

In summary, the multilayer ceramic capacitor 1i is characterized in that it is a multilayer capacitor of series capacitance type. Therefore, as internal electrodes, there are formed an internal electrode 3c connected to the first external electrode 11, an internal electrode 3d connected to the second external electrode 12, and an internal electrode 3e facing both the internal electrodes 3c and 3d.

As illustrated in FIG. 10, the multilayer ceramic capacitor 1i has the active part 15 represented by a region surrounded by a dashed line. The active part 15 has the low-activity regions 30 and 31 represented by regions indicted by alternate long and short dash lines in FIG. 10.

Figure 11A:
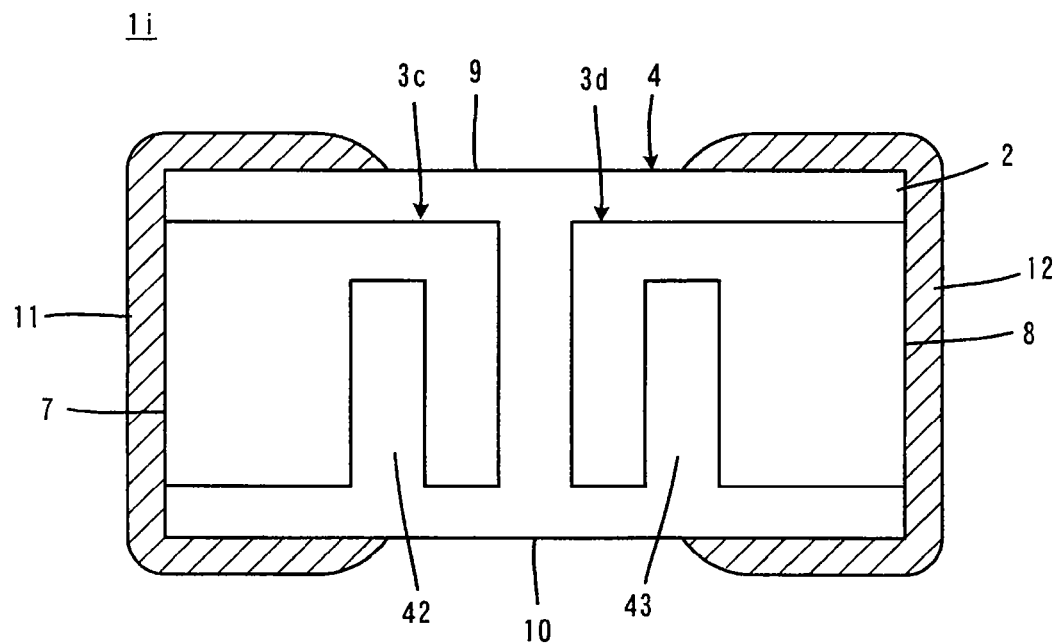
FIG. 11A and FIG. 11B are plan views illustrating an internal electrode pattern in the multilayer ceramic capacitor 1i of FIG. 10.
Figure 11B:
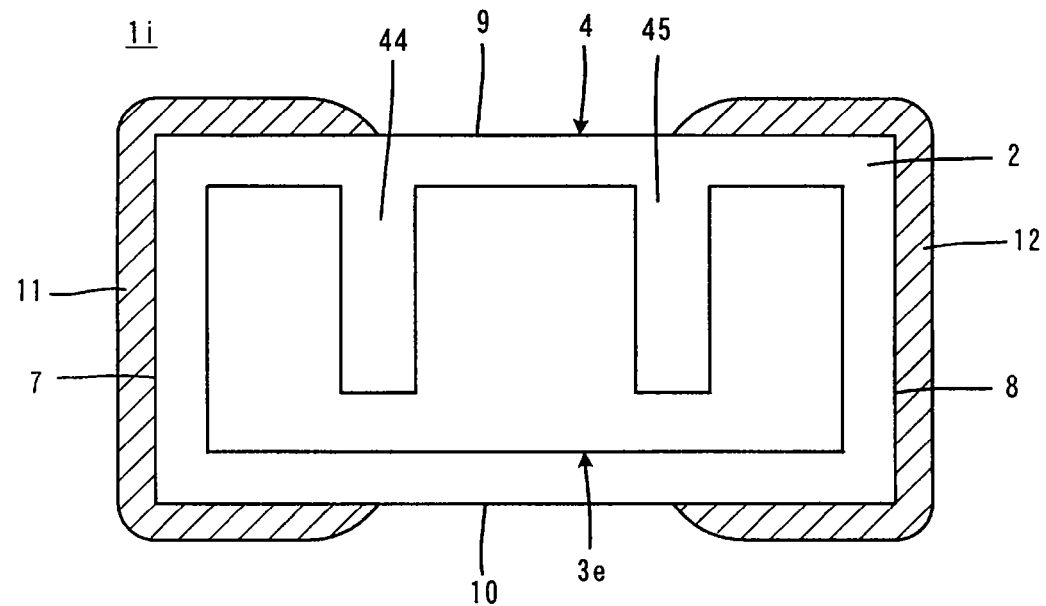

As illustrated in FIG. 11A, the internal electrode 3c has a notch 42 for providing the low-activity region 30, and the internal electrode 3d has a notch 43 for providing the low-activity region 31. At the same time, as illustrated in FIG. 11B, the internal electrode 3e has notches 44 and 45 for providing the low-activity regions 30 and 31, respectively.

As illustrated in FIG. 10, the multilayer ceramic capacitor 1i has the low-activity regions 30 and 31 that pass through the active part 15 in the thickness direction. Alternatively, the low-activity regions 30 and 31 may be provided in part of the active part 15 in the thickness direction.

Although the present invention has been described with reference to the illustrated embodiments, various modifications can be made within the scope of the present invention.

For example, notches for providing low-activity regions in the illustrated embodiments are formed in specific parts of internal electrodes. Alternatively, specific parts of the internal electrodes may be formed in mesh-like pattern to reduce the facing area of internal electrodes.

Next, there will be described an exemplary experiment performed to determine numerical limitations defining the scope of the present invention and to confirm the effect of the present invention.

Figure 12:
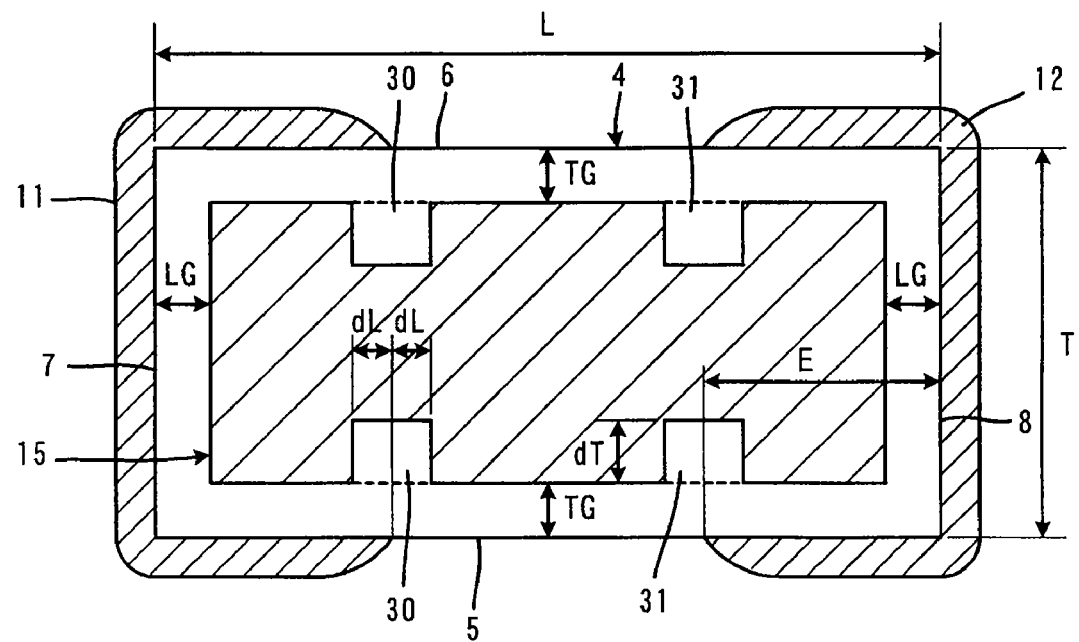

FIG. 12 corresponds to FIG. 1A and illustrates a sample prepared in the exemplary experiment. In FIG. 12, elements equivalent to those illustrated in FIG. 1A are given the same reference numerals.

FIG. 12 shows dimensions of various parts of the multilayer ceramic capacitor 1a. Of these dimensions, L, T, E, TG, and LG were fixed as L=2.0 mm, T=1.25 mm, E=0.425 mm, TG=0.1 mm, and LG=0.1 mm. Then, as shown in Table 1 and Table 2 below, samples with different values of dL and dT were prepared.

Although not shown in FIG. 12, the size of the capacitor body 4 in the width direction (i.e., the size in the direction orthogonal to the plane of FIG. 12) was 1.25 mm, the thickness of an internal electrode was 1.2 μm, and the thickness of a dielectric ceramic layer was 3 μm. The number of laminated internal electrodes was 250. The dielectric ceramic layers were composed of a $BaTiO_3$-based material, the conductive component of the internal electrodes was composed of Ni, and the conductive material of the first and second external electrodes 11 and 12 was Cu.

Figure 13A:
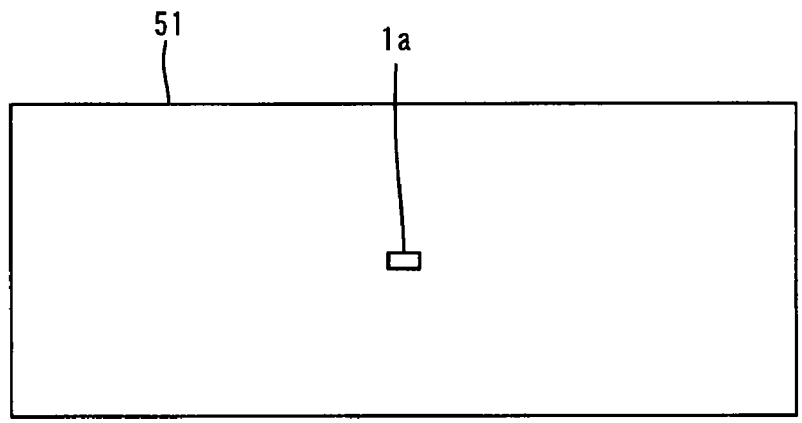
FIG. 13 illustrates a method for measuring a substrate displacement evaluated in the exemplary experiment.

Then, the substrate displacement was evaluated for each of the samples prepared. FIG. 13 illustrates a method for evaluating a substrate displacement. FIG. 13A is a plan view and FIG. 13A is a front view.

Figure 13B:
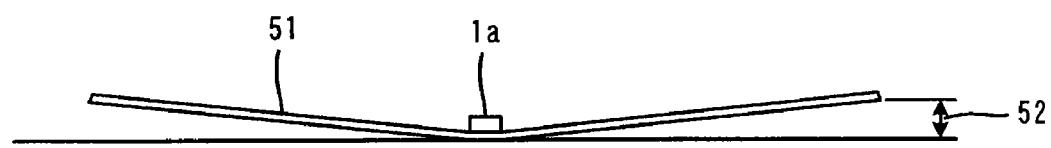

As illustrated in FIG. 13, a substrate 51 made of glass epoxy resin and measuring 100 mm long by 40 mm wide by 0.8 mm thick was prepared. Then, the multilayer ceramic capacitor 1a serving as a sample was mounted on the substrate 51 at the center thereof. Sn—Pb eutectic solder was used as a conductive bonding material for mounting. The multilayer ceramic capacitor 1a was mounted such that the longitudinal direction of the multilayer ceramic capacitor 1a coincided with that of the substrate 51. Then, a voltage of 10 V was applied to the multilayer ceramic capacitor 1a. As illustrated in FIG. 13B, the displacement 52 at an end in the longitudinal direction of the substrate 51, with respect to an origin at the center of the substrate 51, was measured. The measured displacement 52 is used as a substrate displacement.

Table 1 shows each substrate displacement as a percentage with respect to the substrate displacement that occurred when dL=0. Table 2 shows each substrate displacement in percentage with respect to the substrate displacement that occurred when dT=0. For each sample, the value of (x1−x2)/x3 was determined from measurements of the displacements x1, x2, and x3 shown in FIG. 15. The resulting values are shown in Table 1 and Table 2.

With the value of dT fixed at 0.05 mm, Table 1 compares samples having different values of dL.

TABLE 1

| SAMPLE NO. | dL [mm] | dL/L | SUBSTRATE DISPLACEMENT [%] | (x1 − x2)/x3 |
|---|---|---|---|---|
| 1 | 0 | 0 | 100 | 0.65 |
| 2 | 0.04 | 0.02 | 92 | 0.61 |
| 3 | 0.05 | 0.025 | 90 | 0.60 |
| 4 | 0.1 | 0.05 | 83 | 0.58 |
| 5 | 0.2 | 0.1 | 75 | 0.57 |
| 6 | 0.325 | 0.1625 | 85 | 0.59 |

As shown in Table 1, each of samples 3 to 6 having values of dL greater than or equal to 0.05 mm, have a value of dL/L is greater than or equal to 0.025, the substrate displacement is suppressed to less than or equal to 90%, and the value of (x1−x2)/x3 is suppressed to less than or equal to 0.06.

Although the value of dL/L for sample 6 is greater than that for sample 5, the substrate displacement and the value of (x1−x2)/x3 for sample 6 are greater than those for sample 5. This is because sample 6 with dL=0.325 mm corresponds to the embodiment illustrated in FIG. 5.

Next, with the value of dL fixed at 0.05 mm, Table 2 compares samples having different values of dT.

TABLE 2

| SAMPLE NO. | dT [mm] | dT/L | SUBSTRATE DISPLACEMENT [%] | (x1 − x2)/x3 |
|---|---|---|---|---|
| 11 | 0 | 0 | 100 | 0.65 |
| 12 | 0.04 | 0.02 | 92 | 0.61 |
| 13 | 0.05 | 0.025 | 90 | 0.60 |
| 14 | 0.1 | 0.05 | 85 | 0.58 |
| 15 | 0.2 | 0.1 | 76 | 0.52 |
| 16 | 0.3 | 0.15 | 73 | 0.50 |
| 17 | 0.4 | 0.2 | 69 | 0.47 |
| 18 | 0.525 | 0.2625 | 67 | 0.45 |

Samples 11 and 13 shown in Table 2 are equivalent to respective samples 1 and 3 shown in Table 1.

As shown in Table 2, each of samples 13 to 18 having values of dT greater than or equal to 0.05 mm, have a value of dT/L greater than or equal to 0.025, the substrate displacement is suppressed to less than or equal to 90%, and the value of (x1−x2)/x3 is suppressed to less than or equal to 0.06.

Sample 18 corresponds to the embodiment illustrated in FIG. 6, as can be seen from the value of dT.

The invention claimed is:

1. A multilayer ceramic capacitor comprising:
a capacitor body having a multilayer structure including a plurality of dielectric ceramic layers and a plurality of internal electrodes each of which is disposed at a different interface between adjacent dielectric ceramic layers, and having a substantially rectangular parallelepiped shape defined by first and second main surfaces extending in a direction in which the dielectric ceramic layers extend, first and second end surfaces extending in a direction orthogonal to the main surfaces, and first and second side surfaces; and
a first and second external electrodes disposed at the respective first and second end surfaces and extending therefrom to respective parts of the main surfaces and side surfaces adjacent to the end surfaces, and connected to specific ones of the internal electrodes such that capacitances formed between the internal electrodes facing each other with the dielectric ceramic layers therebetween are extracted,
the capacitor body having an active part having a substantially rectangular parallelepiped shape and being the volume containing the portions of the internal electrodes which face each other and contribute to formation of capacitances between them upon application of electrical energy;
wherein said active area contains a pair of low-activity regions at least a portion of which is disposed in respective cylindrical regions in the active part having a radius of 0.025 L about respective lines in which a plane parallel to the end surfaces and passing through a position of an end edge of a respective one of the first and second external electrodes on the first main surface of the capacitor body intersects a surface of the active part adjacent to the first main surface, wherein L is the distance between the first and second end surfaces in the longitudinal direction of the capacitor body, and wherein each low-activity region is defined by the volume containing facing internal electrodes for forming capacitances in which the facing area of those electrodes is less than or equal to one fifth that of the internal electrodes in another region of the active part having the same volume as that of the low-activity region.

2. The multilayer ceramic capacitor according to claim 1, wherein the parallelepiped shape of the active part is defined by a plurality of surfaces and the low-activity region includes a surface of the active part.

3. The multilayer ceramic capacitor according to claim 1, wherein the parallelepiped shape of the active part is defined by a plurality of surfaces and the low-activity region does not include a surface of the active part.

4. The multilayer ceramic capacitor according to claim 1, wherein a low-activity part has a semicircular or substantially semicircular cross-section.

5. The multilayer ceramic capacitor according to claim 1, wherein a low-activity part has a rectangular cross-section.

6. The multilayer ceramic capacitor according to claim 1, wherein each low-activity region has dimensions such that an electric field induced distortion at a surface of the capacitor is reduced by at least 10% relative to the electric field induced distortion at another region of the active part.

7. The multilayer ceramic capacitor according to claim 6, wherein each low-activity region has a length of a plane parallel to the first main surface such that one-half of said plane length divided by the length of the first main surface is at least 0.025.

8. The multilayer ceramic capacitor according to claim 7, wherein the active part is symmetric with respect to a plane parallel to the first and second main surfaces and passing through a center between the first and second main surfaces.

9. The multilayer ceramic capacitor according to claim 1, wherein the active part is symmetric with respect to a plane parallel to the first and second main surfaces and passing through a center between the first and second main surfaces.

10. A multilayer ceramic capacitor comprising:
a capacitor body having a multilayer structure including a plurality of dielectric ceramic layers and a plurality of internal electrodes each of which is disposed at a different interface between adjacent dielectric ceramic layers, and having a substantially rectangular parallelepiped shape defined by first and second main surfaces extending in a direction in which the dielectric ceramic layers extend, first and second end surfaces extending in a direction orthogonal to the main surfaces, and first and second side surfaces;
a first and second external electrodes disposed at the respective first and second end surfaces and extending therefrom to respective parts of the main surfaces and side surfaces adjacent to the end surfaces, and connected to specific ones of the internal electrodes such that capacitances formed between the internal electrodes facing each other with the dielectric ceramic layers therebetween are extracted,
a substrate facing the first main surface of the capacitor body and conductively bonded to the capacitor first and second external electrodes,
the capacitor body having an active part having a substantially rectangular parallelepiped shape and being the volume containing the portions of the internal electrodes which face each other and contribute to formation of capacitances between them upon application of electrical energy;
wherein said active area contains a pair of low-activity regions at least a portion of which is disposed in respective cylindrical regions in the active part having a radius of 0.025 L about respective lines in which a plane parallel to the end surfaces and passing through a position of an end edge of a respective one of the first and second external electrodes on the first main surface of the capacitor body intersects a surface of the active part adjacent to the first main surface, wherein L is the distance between the first and second end surfaces in the longitudinal direction of the capacitor body, and wherein each low-activity region is defined by the volume containing facing internal electrodes for forming capacitances in which the facing area of those electrodes is less than or equal to one fifth that of the internal electrodes in another region of the active part having the same volume as that of the low-activity region.

11. The multilayer ceramic capacitor according to claim 10, wherein the parallelepiped shape of the active part is defined by a plurality of surfaces and the low-activity region includes a surface of the active part.

12. The multilayer ceramic capacitor according to claim 10, wherein the parallelepiped shape of the active part is defined by a plurality of surfaces and the low-activity region does not include a surface of the active part.

13. The multilayer ceramic capacitor according to claim 10, wherein a low-activity part has a semicircular or substantially semicircular cross-section.

14. The multilayer ceramic capacitor according to claim 10, wherein a low-activity part has a rectangular cross-section.

15. The multilayer ceramic capacitor according to claim 10, wherein each low-activity region has dimensions such that an electric field induced distortion at a surface of the capacitor is reduced by at least 10% relative to the electric field induced distortion at another region of the active part.

16. The multilayer ceramic capacitor according to claim 15, wherein each low-activity region has a length of a plane parallel to the first main surface such that one-half of said plane length divided by the length of the first main surface is at least 0.025.

17. The multilayer ceramic capacitor according to claim 16, wherein the active part is symmetric with respect to a plane parallel to the first and second main surfaces and passing through a center between the first and second main surfaces.

18. The multilayer ceramic capacitor according to claim 10, wherein the active part is symmetric with respect to a plane parallel to the first and second main surfaces and passing through a center between the first and second main surfaces.

* * * * *